Aug. 10, 1943.                J. R. DORMAN                2,326,292
                              TUBE AND COUPLING
                            Filed Sept. 25, 1942

INVENTOR.
Jack R. Dorman
BY
Wood, Arey, Henn & Evans
ATTORNEYS

Patented Aug. 10, 1943

2,326,292

UNITED STATES PATENT OFFICE 2,326,292

TUBE AND COUPLING

Jack R. Dorman, Cincinnati, Ohio

Application September 25, 1942, Serial No. 459,682

9 Claims. (Cl. 285—25)

This invention relates to flexible tubing of a type having utility in various fluid conveyance lines, such as for example, a fuel line in an automobile or other motor vehicle. The invention is particularly concerned with the establishment of a sealed connection between the ends of tubing of this general type and a terminal point of some sort, such as, for example, a carburetor or a tank.

The invention will be disclosed particularly in relation to a fuel line. However, as will be apparent from the ensuing description, there are many other uses to which the construction of the invention may be put. Although in one form the invention is particularly directed to a low pressure line such as a gas or oil line of the general type referred to utilizing a slight modification which will likewise be described, it is entirely practicable to use the construction of the invention in lines in which the pressure is relatively high, such as, for example, lines used for various types of industrial purposes.

One of the major concepts of the invention is to provide a tubing connection which completely dispenses with the use of any kind of fittings. The advantage of this is apparent because, in a conventional connection of this general type, the cost of the fitting represents a very substantial part of the cost of the entire connection. Furthermore, fittings are conventionally fabricated from metals such as brass and, to some extent, from hard rubber, all of which products are scarce and difficult to obtain during the present emergency.

The material which constitutes the preferred material from which the tubing of the invention is formed is a flexible and compressible synthetic plastic. There are a number of plastic materials of this general type available at the present time and, provided that the material may be formed into tubing of sufficient strength for the purposes of the invention and has a certain degree of flexibility and resiliency, any one of such materials should prove to be satisfactory for the purpose intended.

In accordance with these general principles, one of the particular objects of the invention has been to provide a connection between a length of tubing and a terminal point, such as for example a wall, which connection completely dispenses with the use of fittings or connectors.

Another object of the invention has been to provide a connection of the type described in which the tubing is preferably formed from a resilient plastic material rather than the conventional metals, such as copper or brass, which are very difficult to obtain at the present time.

Another object of the invention has been to provide a connection in which an end of the tubing may be quickly and easily fitted into a preformed opening in a wall to form an effective seal against the escape of fluids passing through the tube.

Another object has been to provide a connection in which there is formed a completely adequate seal for low pressure purposes and which with a slight modification forms an adequate seal against fluids moving under high pressure as well.

Other and further advantages will be apparent from a consideration of the further and more detailed description of the invention when considered in conjunction with the drawing in which.

Figure 1:
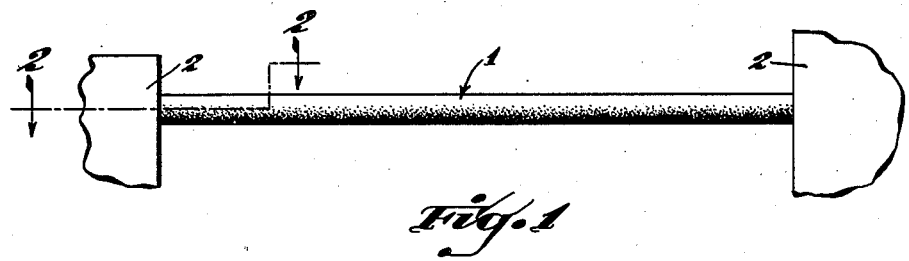
Figure 1 is an elevation showing a length of tubing of the preferred type of the invention connected at each end to a vertical wall.

As shown in Figure 1, a length of tubing indicated generally at 1 may have its ends affixed directly into vertical walls indicated generally at 2 without the use of fittings or any other form of connectors. The tubing shown in this figure is preferably formed from a flexible resilient plastic of the type which has previously been mentioned.

Figure 2:
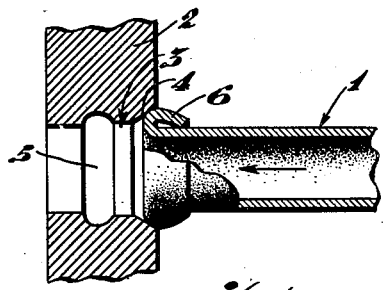
Figure 2 is a sectional view taken on line 2—2, Figure 1, and illustrating an end of the tubing about to be inserted in a pre-formed opening in a wall.

The details of the construction of the invention may best be appreciated from a consideration of Figure 2. In this figure, 3 represents generally a pre-formed passageway in a wall. This passageway may have a flared opening 4. At an interior point in the passageway, an annular groove 5 is formed in the wall of the passageway.

Figure 3:
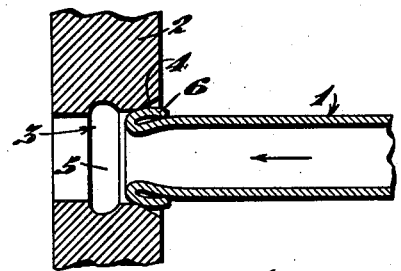
Figure 3 is a similar view showing the end of the tubing partially inserted in the opening.
Figure 4:
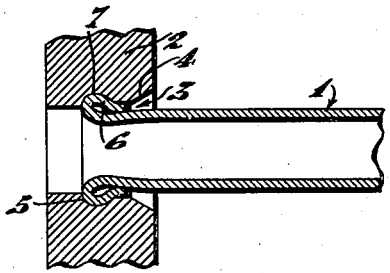
Figure 4 is a similar view showing the tubing fully inserted and in operative position.

Prior to inserting the tubing in this passageway, the end of the tube has been rolled back on itself to form a bead 6. Because of the nature of the tubing material contemplated by the invention, this bead and, in fact, the tube generally, is resilient and compressible to a degree sufficient to permit the manual insertion of the end of the tube in the pre-formed passageway under compression, as illustrated in Figure 3, until, as shown in Figure 4, the bead 6 has reached the annular groove 5. When it has reached this point, the bead, and to some extent the wall of the tube, will expand outwardly and, with the surfaces of the groove, form a tight seal along the line 7, thereby effectively confining any fluid passing to and from the tank through the tube.

Figure 5:
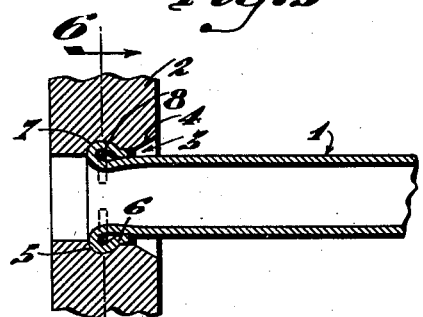
Figure 5 is a similar view to Figure 4 showing a modification of the invention particularly intended for use in a high pressure line.
Figure 6:
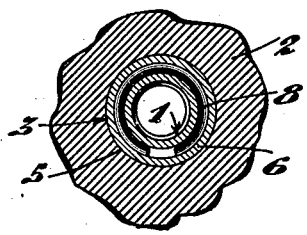
Figure 6 is a sectional view taken on line 6—6, Figure 5.

Although the natural resiliency of the bead and tube forms an effective seal where the fluid is moving under low pressure, in the case of fluids moving under high pressure it is desirable to provide a tighter seal. This may be done, as illustrated in Figures 5 and 6, by inserting in the bead 6 under tension a split ring spring 8. This type of spring may be formed from spring steel or like material and very effectively increases the pressure against the outer edge of the bead, forcing it more firmly into the groove and thereby strengthening the seal.

It will be quite apparent from the foregoing description that the construction of the invention provides a simple but very effective way of forming a connection between a tube and a wall without the use of fittings or similar expedients. Since the form of the invention described is the preferred form only, it is possible that various changes and modifications may be made without departing from the spirit of the invention.

Having fully described my invention, I claim:

1. A tubing connection comprising a length of flexible and resilient tubing having an end rolled backwardly on itself forming a bead and a wall structure having a passageway therethrough, said passageway having an annular internal groove positioned inwardly from the passageway opening for the reception of the bead when the tubing end is inserted in the passageway; said bead cooperating with the surface of the groove to form a seal.

2. In combination, a length of flexible and resilient tubing having an end rolled on itself forming a bead and a wall structure having a passageway therethrough, said passageway having a flared opening to facilitate the insertion of the end of the tubing and an annular groove disposed inwardly from the opening, said groove being adapted to accommodate the bead on the tubing and to cooperate therewith to form a seal.

3. In a line for the transmission of fuel or the like a length of flexible plastic tubing, a peripheral cuff formed at one end thereof and expansible spring means associated with said cuff for expanding the end of the tube to produce a tighter seal between said end and a wall aperture or the like in which said end may be inserted.

4. A tubing connection comprising a length of flexible plastic tubing having an end edge rolled on itself to form a peripheral cuff, expansible spring means enclosed in said cuff for forcing the rolled edge of said bead outwardly and a wall structure having a passageway therethrough, said passageway having an annular internal groove spaced inwardly from the opening thereof for the reception of the bead when the tubing end is inserted in the passageway, the expansion of the cuff edge outwardly against the walls of the groove providing a seal preventing the escape of fluids passing the connection.

5. In combination a length of resilient plastic tubing having an end edge rolled on itself to form a peripheral bead, a split ring spring positioned between said rolled edge and the tube and a wall structure having a passageway therethrough; said passageway having a flared opening to facilitate the insertion of the beaded end of the tubing, and an annular groove disposed inwardly from the opening, the surface of the tubing bead cooperating with the surface of the said groove to provide a seal against the escape of fluids passing through the tubing.

6. A new article of manufacture consisting o. a length of flexible plastic tubing having an end edge rolled backward on itself to form a peripheral bead, and an expansible spring element associated with the bead for expanding said bead edge outwardly and providing a sealed connection when the tubing end is positioned in an opening in a connecting element.

7. A connector means for attaching the end of tubing including, the tubing, said tubing being formed from a plastic material and having the material turned at the end of the tube to form a cuff, an element including a bore for receiving the aforesaid end of the tube, said bore having an annular groove therein, said bore being of less diameter than the diameter of the cuff, and the groove being of slightly less diameter than the diameter of the cuff, and said bore including a flared opening for insertion of the tubing.

8. A coupling means consisting of a length of plastic tubing having a bead on its end, and an element to which the tubing is attached, including, the groove in which the beading fits, said beading adapted to yield as the end of the tubing is placed in connection with the element and to spring into place in the groove due to the inherent elasticity of the plastic of which the tubing is formed.

9. A new article of manufacture consisting of a length of resilient plastic tubing having an end edge rolled backward on itself to form a peripheral cuff, said cuff having a portion spaced from the wall of the tube to provide an annular space therebetween and adapted to exert an outward expansible pressure when confined in a connecting element, to provide a seal between the tubing and the connecting element.

JACK R. DORMAN.